United States Patent
Saitou et al.

(10) Patent No.: US 6,730,250 B2
(45) Date of Patent: May 4, 2004

(54) METHOD AND APPARATUS FOR STABILIZING MATERIAL PHYSICAL PROPERTIES OF RECYCLABLE BUMPERS

(75) Inventors: Akihisa Saitou, Tokyo (JP); Tsuneo Koike, Tokyo (JP); Hideaki Suzuki, Tokyo (JP); Kazuo Ando, Saitama (JP)

(73) Assignees: Honda Giken Kogyo Kabushiki Kaisha, Tokyo (JP); Kyowa Industry Co., Ltd., Saitama (JP)

( * ) Notice: Subject to any disclaimer, the term of this patent is extended or adjusted under 35 U.S.C. 154(b) by 0 days.

(21) Appl. No.: 10/232,323

(22) Filed: Sep. 3, 2002

(65) Prior Publication Data

US 2003/0057588 A1 Mar. 27, 2003

(30) Foreign Application Priority Data

Sep. 3, 2001 (JP) .................... P. 2001-265655

(51) Int. Cl.$^7$ .............. B29B 9/02; B29B 17/00
(52) U.S. Cl. ............ 264/141; 156/344; 241/3; 241/23; 241/24; 241/28; 241/65; 241/79; 241/260.1; 264/349; 264/911; 425/308
(58) Field of Search ................ 264/141, 349, 264/911; 425/308; 156/344; 241/3, 23, 24, 28, 65, 79, 260.1

(56) References Cited

U.S. PATENT DOCUMENTS

| 2,718,471 A | 9/1955 | Samler |
| 5,566,888 A | 10/1996 | Yamamoto |

FOREIGN PATENT DOCUMENTS

| EP | 0 381 424 A2 | 8/1990 |
| EP | 0 553 787 A1 | 8/1993 |
| EP | 0 561 187 A1 | 9/1993 |
| EP | 0 582 300 A1 | 2/1994 |
| EP | 0 584 501 A1 | 3/1994 |
| EP | 0 739 701 A2 | 10/1996 |

OTHER PUBLICATIONS

Abstract of JP–62062713–A (Mar. 19, 1987).*
Abstract of JP–63145612–U (Sep. 26, 1988).*
Abstract of JP–05042292–B2 (Jun. 28, 1993).*
Abstract of JP–08309750–A (Nov. 26, 1996).*
Abstract of JP–11058379–A (Mar. 2, 1999).*
Abstract of JP–2000281846–A (Oct. 10, 2000).*
Patent Abstracts of Japan, vol. 2000, No. 9, Oct. 13, 2000 & JP 2000–176938, Jun. 27, 2000.
Patent Abstracts of Japan, vol. 005, No. 010 (M–051), Jan. 22, 1981 & JP 55–140528, Nov. 4, 1980.
"Recycling–Stossfanger fur Hochste Anspruche", Kunststoffe, Carl Hanser Verlag, Munchen, Germany, vol. 84, No. 7, Jul. 1, 1994.

* cited by examiner

Primary Examiner—Leo B. Tentoni
(74) Attorney, Agent, or Firm—Arent Fox Kintner Plotkin & Kahn, PLLC

(57) ABSTRACT

A method for stabilizing material physical properties of recyclable bumpers including the steps of: separating coating from raw material obtained by cleaning, fracturing and drying recyclable bumpers to form a recycled matrix; mixing an additive with the recycled matrix; melting and extruding the mixed matrix with an extrusion machine; cutting the molten and extruded matrix to produce pellets; introducing the pellets into a tank of a predetermined capacity; and mixing the pellets in the tank for a predetermined period of time while again delivering the pellets in the tank to an introduction opening of the tank for reintroduction into the tank in parallel with the pellets that are to be newly introduced.

5 Claims, 3 Drawing Sheets

METHOD AND APPARATUS FOR STABILIZING MATERIAL PHYSICAL PROPERTIES OF RECYCLABLE BUMPERS

BACKGROUND OF THE INVENTION

1. Field of the Invention

The present invention relates to method and apparatus for stabilizing material physical properties of recyclable bumpers which promote the reuse of used bumpers of disused vehicles or failed bumpers for vehicles

2. Description of the Related Art

Conventionally, recyclable bumpers are cleaned, fractured and dried for conversion into fractured raw material, and coating on the fractured material is then separated therefrom to produce a recycled matrix for reuse. However, the recycled matrix has not been used for producing automotive bumpers as it is but has been used at the most only for production of bumper cores and is generally used for producing other automotive parts. Even when used to produce other automotive parts, the recycled matrix is used indiscriminately for parts which are not visible and in particular for those which are easy to be molded.

The difference in material physical properties between the recycled matrix produced from the recyclable bumpers and a virgin material is conspicuous when compared, and this difference in material physical properties causes scattering in material physical properties of a recycled product, leading to a problem that recycled products are liable to molding failures. Consequently, using the recycled material for painted parts as it is results in the fact that the external product quality cannot reach an acceptable level. Even when the material is reused for parts that are invisible, there is caused a problem that molds need to be modified due to the different material physical properties. In addition, in a molding method in which the recycled material is adopted for a material for bumper cores, there is a problem that the productivity is deteriorated due to differences in configuration and thickness of bumpers. In particular, with the recycled material from which coating is separated, there is a problem that the material cannot be adopted due to scattering in material physical properties for large resin molded products such as vehicle bumpers which are high in difficulty in molding.

SUMMARY OF THE INVENTION

The present invention was made in view of the problems and an object thereof is to provide novel method and apparatus for stabilizing material physical properties of recyclable bumpers which allow a recycled material from recyclable bumpers to be used for large resin parts such as painted bumpers which require strict external product quality and which can provide as good a quality as a virgin material from a 100% recycled material, With a view to attaining the object, according an aspect of the invention, there is provided a method for stabilizing material physical properties of recyclable bumpers comprising the steps of separating coating from the fractured material obtained by cleaning, fracturing and drying recyclable bumpers, to thereby make a recycled matrix, mixing an additive with the recycled matrix, melting and extruding the mixed matrix with an extrusion machine and cutting the molten and extruded matrix to produce pellets melting, and introducing the pellets into a tank of a predetermined capacity and mixing the pellets in the tank for a predetermined period of time while delivering the pellets in the tank to an introduction opening of the tank again for reintroduction into the tank in parallel with the pellets that are newly introduced. Namely, with the method according to the invention, since the pellets in the tank are mixed for a predetermined period of time while introducing the pellets that are newly introduced, scattering in material physical properties is restrained, and moreover, residual coating pieces that affect the material physical properties are dispersed to stabilize the material physical properties.

DETAILED DESCRIPTION OF THE PREFERRED EMBODIMNETS

Figure 1:
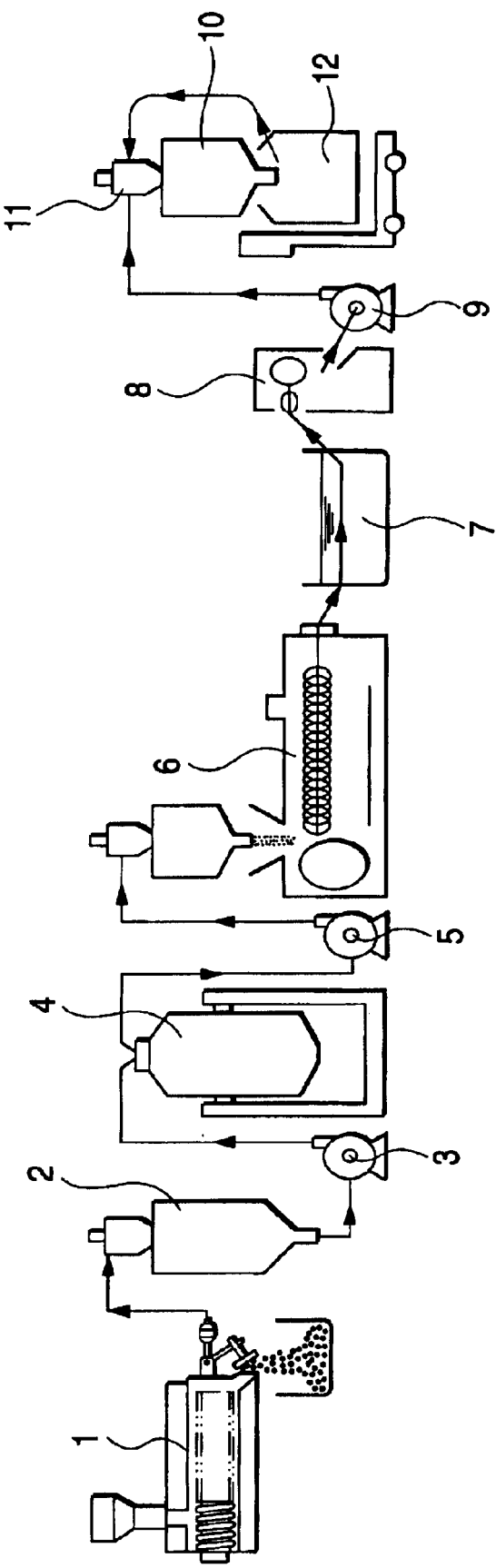
FIG. 1 is an explanatory view showing method and apparatus according to the invention.

The invention will be described in detail with reference to an embodiment illustrated in the accompanying drawings. FIG. 1 is an explanatory view of processes of a method and an apparatus according to the invention.

In the figure, reference numeral 1 denotes a coating separating machine for separating coating from fractured raw material produced by cleaning, fracturing and drying recyclable bumpers to produce recycled matrix and the coating separating machine separates coating from the fractured raw material which is fractured substantially into a square piece of 2 cm by 2 cm. While any means may be used for separating the coating from the fracture raw material, in the embodiment a coating separating machine is used which is driven to rotate and which has a similar construction to that of a rice cleaning machine, and when the fractured raw material is passed several times through the coating separating machine for separating coating therefrom, it is possible to attain a condition close to a coating residue rate of substantially 0%.

The recycled material that has completed the coating separation process by the coating separating machine is introduced into a tank 2 for storage and is then fed into a tumbler 4 by a blower 3. An additive, preferably high-density polyethylene, is introduced into this tumbler 4, where both the recycled material and the additive are mixed together. The recycled matrix and the additive are not necessarily mixed uniformly since the recycled matrix is grounded substantially to the square pieces of 2 cm by 2 cm and the additive has spheres of a size of in the order of 2 to 3 mm.

Figure 2:
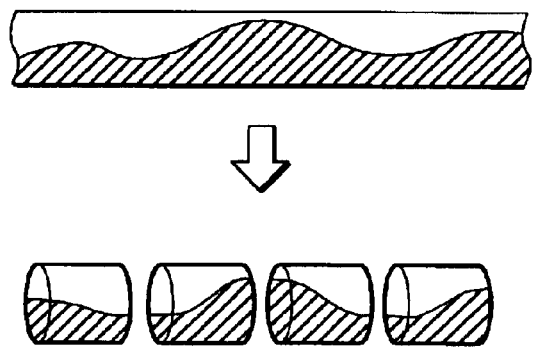
FIG. 2 is a view showing a process of cutting an injected thread-like product having uniformless density distributions of a recycled matrix and an additive to produce pellets.
Figure 3:
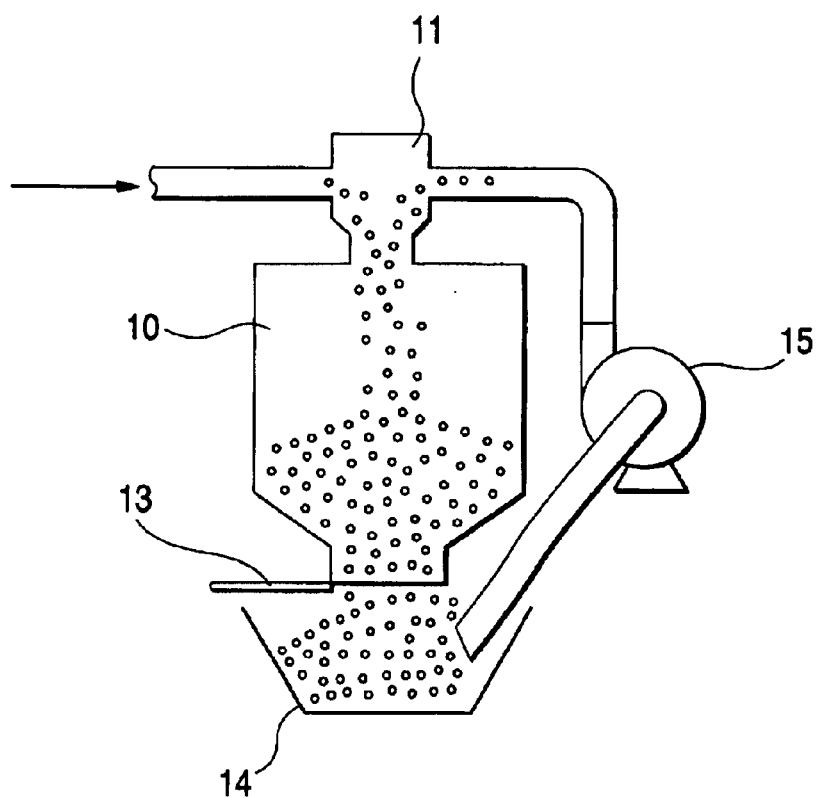
FIG. 3 is an explanatory view showing a main part of the method and apparatus according to the invention.

The mixed material which has passed the process where the recycled matrix and the additive are mixed is then introduced into an extrusion machine 6 for a melting and extruding process. In this extrusion machine 6, while the mixed material of the recycled matrix and the additive is heated to be molten and is then extruded in the form of treads, since there is not provided a uniform mixing in the previous process, which is the mixing process, the density distributions of the recycled matrix and the additive in an injected thread-like product are not uniform. The thread-like product having the different density distributions is then cooled by cooling water 7 to be sent to a pelletizer 8 for cutting into pellets (refer to FIG. 2).

The pelletized product is then sent into an introduction opening 11 of a tank 10 on a flexible container pack 12 for shipment of product. In this invention, a closing lid 13 is provided at an outlet of the tank 10, and the closing lid 13 is kept closed until there is accumulated a product of 100 kg inside the tank 10 When there is accumulated a product of 100 kg inside the tank 10, the closing lid 13 is then opened so that the product so accumulated is taken out into a product receiver 14 provided below the tank 10. Then, the closing lid 13 is closed again, and the product on the product receiver 14 is returned to the introduction opening 11 by a blower 15 to be mixed with a newly pelletized product sent into the introduction opening 11 from the pelletizer 8. This mixing operation is repeated for 5–30 minutes per a product of 100 kg, e.g. in the order of 20 minutes per a product of 100 kg, and thereafter the product so mixed is then supplied to the flexible container pack 12 for shipment as a final product.

The following results shown in Table 1 were obtained from a comparison between the product obtained from the method and apparatus according to the invention, that is, the product that was mixed as described above, and an incomplete product that was not subjected to the mixing. Namely, bumpers were molded of the recycled product obtained according to the invention, and as a result, there was produced no failed products or the failure rate was 0%.

TABLE 1

| Items | Mixing | |
| --- | --- | --- |
|  | Yes | No |
| MI Value Standard Deviation | 0.13 | 0.39 |
| Bumper Molding Failure Rate | 0% | 6% |

Figure 4:
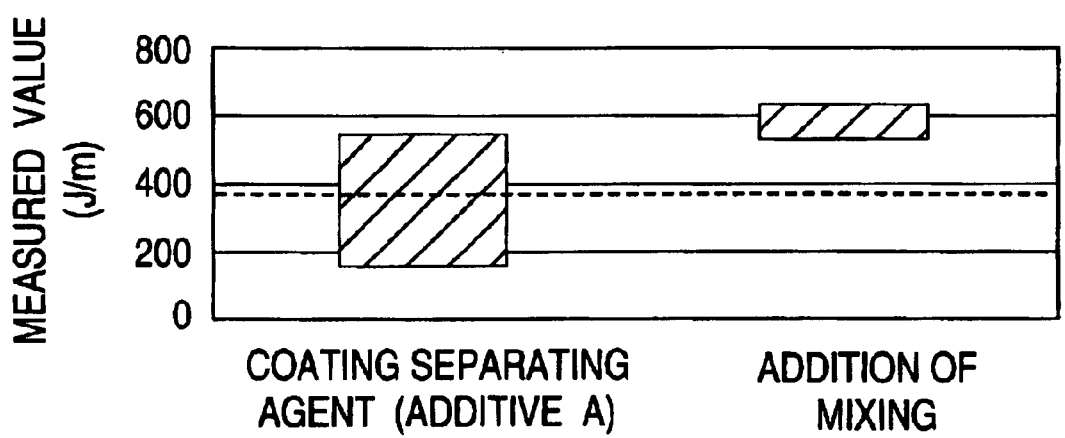
FIG. 4 is a graph showing that the Izod Impact Value Specification (a dotted line denotes the specification) is satisfied by implementing mixing according to the method of the invention.

Furthermore, as shown in FIG. 4, the Izod Impact Value Specification was satisfied by implementing mixing using the method and apparatus according to the invention.

While only certain embodiment of the invention has been specifically described herein, it will apparent that numerous modification may be made thereto without departing from the spirit and scope of the invention.

As has been described above, since the method and apparatus for stabilizing material physical properties of recyclable bumpers according to the invention are constructed such that recyclable bumpers are cleaned, fractured and dried to make fractured raw material, that recycled matrix is made by separating coating from the fractured material, that an additive is mixed with the recycled matrix, that the mixed matrix is molten and extruded with an extrusion machine and the molten and extruded matrix is cut to produce pellets, and that the pellets so produced are introduced into a tank of a predetermined capacity and the pellets in the tank are mixed for a predetermined period of time while delivering the pellets in the tank to an introduction opening of the tank again for reintroduction into the tank in parallel with the pellets that are newly introduced, scattering in material physical properties can be suppressed, and moreover, the residual coating pieces that affect material physical properties can be dispersed, whereby the material physical properties can be stabilized. As a result, there is provided an advantage that the recycled material from the recyclable bumpers can be applied to large resin parts such as painted bumpers which require strict external product quality, thus making it possible to obtain from the 100% recycled material a quality which is as good as that provided by a virgin material.

What is claimed is:

1. A method for stabilizing material physical properties of recyclable bumpers comprising the steps of:

separating coating from raw material obtained by cleaning, fracturing and drying recyclable bumpers, to thereby make a recycled matrix;

mixing an additive with the recycled matrix;

melting and extruding the mixed matrix with an extrusion machine;

cutting the molten and extruded matrix to produce pellets;

introducing the pellets into a tank of a predetermined capacity; and mixing the pellets in the tank for a predetermined period of time while delivering the pellets in the tank to an introduction opening of the tank again for reintroduction into the tank in parallel with the pellets that are newly introduced.

2. The method according to claim 1, wherein the additive is high density polyethylene.

3. The method according to claim 1, wherein a stirring time for mixing the pellets in the tank while introducing the pellets that are newly introduced is 5–30 minutes per 100 kg of pellets.

4. An apparatus for stabilizing material physical properties of recyclable bumpers, comprising:

means for separating coating from raw material obtained by cleaning, fracturing and drying recyclable bumpers, to thereby make a recycled matrix;

means for mixing an additive with the recycled matrix;

an extrusion machine melting and extruding the mixed matrix and a pelletizer cutting the molten and extruded matrix to produce pellets; and a tank having a predetermined capacity, into which the pellets are introduced through an introduction opening thereof;

means for reintroducing the pellets in the tank into the introduction opening of the tank so as to mix the pellets in the tank with the pellets that are newly introduced.

5. The apparatus according to claim 4, wherein the pellets in the tank are delivered to the introducing opening of the tank by a blower.

* * * * *

UNITED STATES PATENT AND TRADEMARK OFFICE
CERTIFICATE OF CORRECTION

PATENT NO. : 6,730,250 B2
DATED : May 4, 2004
INVENTOR(S) : Saitou et al.

It is certified that error appears in the above-identified patent and that said Letters Patent is hereby corrected as shown below:

<u>Title page,</u>
Item [73], Assignee, please delete the following:
"Kyowa Industry Co., Saitama (JP) --

Signed and Sealed this

Thirtieth Day of November, 2004

JON W. DUDAS
*Director of the United States Patent and Trademark Office*